(12) United States Patent
Kosuge

(10) Patent No.: US 7,251,813 B2
(45) Date of Patent: Jul. 31, 2007

(54) SERVER APPARATUS HAVING FUNCTION OF CHANGING OVER FROM OLD TO NEW MODULE

(75) Inventor: Yukio Kosuge, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 10/739,297

(22) Filed: Dec. 19, 2003

(65) Prior Publication Data

US 2004/0136246 A1    Jul. 15, 2004

(30) Foreign Application Priority Data

Jan. 10, 2003    (JP)    ............................. 2003-004167

(51) Int. Cl.
*G06F 9/44* (2006.01)
(52) U.S. Cl. ...................... 717/171; 717/168; 709/220; 709/221; 713/1; 713/100; 718/1
(58) Field of Classification Search ................ 717/168, 717/171; 713/1, 100; 709/220, 221; 718/1
See application file for complete search history.

(56) References Cited

U.S. PATENT DOCUMENTS

| | | | |
|---|---|---|---|
| 6,606,690 B2 * | 8/2003 | Padovano | 711/148 |
| 6,941,518 B2 * | 9/2005 | French et al. | 715/736 |
| 6,976,065 B2 * | 12/2005 | Kaiser et al. | 709/221 |
| 7,181,523 B2 * | 2/2007 | Sim | 709/226 |
| 2003/0101245 A1 * | 5/2003 | Srinivasan et al. | 709/221 |
| 2003/0233385 A1 * | 12/2003 | Srinivasa et al | 709/1 |

FOREIGN PATENT DOCUMENTS

JP    10-023074    1/1998

* cited by examiner

*Primary Examiner*—Wei Zhen
*Assistant Examiner*—Thuy Dao
(74) *Attorney, Agent, or Firm*—Staas & Halsey LLP

(57) ABSTRACT

A server apparatus includes a virtual server control unit for generating a virtual client OS for each module to be started stored in a storing device on the basis of a file start instruction; a boot control unit for loading the module to be started into a main memory and starting the module to be started; an IP address/module name conversion DB managing unit for controlling assignment of an IP address to each module to be started, registering a relation between a module name of the module and the IP address in a first table, and performing conversion between the module name and the IP address; and a routing control unit for routing a message to a module started by a different virtual client OS on the basis of an IP address of the module, the IP address being registered in the first table.

11 Claims, 17 Drawing Sheets

FIG.3

| IP ADDRESS | MODULE NAME | STATE |
|---|---|---|
| 10.20.30.55 | A00 | CURRENT/NEW |
| 10.20.30.70 | A50 | CURRENT/NEW |
| ⋮ | ⋮ | ⋮ |

SERVER APPARATUS HAVING FUNCTION OF CHANGING OVER FROM OLD TO NEW MODULE

BACKGROUND OF THE INVENTION

1. Field of the Invention

The present invention relates to a server apparatus having a function of loading a new file into a main memory and changing over from an old module to a new module.

2. Description of the Related Art

A server or the like changes over from an old file to a new file for an upgrade, addition of a new module, or the like. FIGS. 11 to 17 are diagrams representing a conventional method of changing over to a new file. As shown in FIGS. 11 to 17, servers 2#0 and 2#1 have a duplexed configuration to replace files. The server 2#0 is an operational system and the server 2#1 is a standby system, for example. In the server 2#i, a plurality of applications (modules) 16#iA00, 16#iB10, 16#iC30, . . . operate on a basic Operating System (OS) 4#i. Messages are communicated between the applications 16#iA00. . . and another node 3 via the basic OS 4#i. A conventional file update method is as follows.

In response to each new operation instruction, a message event is notified in a form of a maintenance command to the server 2#i (i=0, 1), and operation is performed by software of the server 2#i (i=0, 1) receiving the notification. In this case, suppose that the applications B10 and C30 are files to be updated to applications B80 and C90.

(1) Loading of New File

As shown in FIG. 11, new system files for an upgrade, for example application programs B80 and C90 for providing service are transferred from an external medium such as a Digital Audio Tape (DAT) or the like or a remote terminal onto disk devices 10#i (i=0, 1) of all the servers 2#i (i=0, 1) that are to update files, so that new files 12#i are created.

(2) Setting of File Update State

In order to regulate processing that may interfere with update operation, a system state retained on the software is changed from "normal" to "file update."

(3) Booting of New File

As shown in FIG. 12, the standby server 2#1 is separated from the duplexed state, and stopped. A reboot program 14#1 is executed to load the new files into a memory. After the reboot, the application programs B80 and C90 stored as the new files 12#1 and a necessary application program A00 that is not to be updated are LM-loaded from the disk 10#1 onto the memory, whereby processes 16#1B80, 16#1C90, and 16#1A00 are generated. The server 2#1 is brought into a standby state. As shown in FIG. 13, the server 2#1 starts operation of the processes 16#1A00, 16#1B80, and 16#1C90, and is brought into a temporary operational state.

(4) Change to New File

As shown in FIG. 14, in order to change from the old files to the new files, the standby server 2#1 is set as an operational server, and the operational server 2#0 is set as a standby server and is stopped.

(5) Establishment of New File

As shown in FIG. 15, to ensure operation of the new file 4#1 of the server 2#1, the system state is monitored for a certain time. Thereafter, in order to change the old file environment of the server 2#0 to a new file environment, the server 2#0 is rebooted by a reboot program 14#0. After the reboot, the application programs B80 and C90 stored as the new files 12#0 and the necessary application program A00 that is not to be updated are LM-loaded from the disk 10#0 onto a memory, whereby processes 16#0B80, 16#0C90, and 16#0A00 are generated. As shown in FIG. 16, the server 2#0 starts operation of the processes 16#0B80, 16#0C90, and 16#0A00 and is brought into a temporary operational state. As shown in FIG. 17, after the operation of the server 2#0 is monitored for a certain time, the server 2#0 is brought into a standby state.

Prior art literature includes the following Patent Literature 1.

Patent Literature 1 discloses a technique for changing over from an active server to a reserve server without changing setting in a client computer.

Patent Literature 1

Japanese Patent Laid-Open No. Hei 10-23074

However, the conventional file update method has the following problems.

(1) When of the plurality of application load modules A00, B10, and C30, the module A00 is not changed and the modules B10 and C30 are changed to add service functions (B10 is changed to B80, and C30 is changed to C90), because a new LM is also created for the module (A00) not capturing the IF and modules are loaded after a reboot, replacement of the files including the old module (A00) needs to be performed. That is, even when only the modules B80 and C90 are necessary, all the modules to be substituted including not only the necessary modules B80 and C90 but also the unnecessary module A00 need to be loaded.

(2) As a condition for performing a file update, the duplexed server configuration is essential. This presents a problem in that investment cost and maintenance cost are increased because of the duplexed configuration.

(3) Changeover from an old file to a new file involves switchover between the servers of the duplexed configuration, thus causing a service interruption time. Also, there is a risk of not being able to change to the new file because of hardware abnormality.

Patent Literature 1 only discloses changeover between an active server and a reserve server in a duplexed configuration and is therefore not able to solve the above problem in the duplexed configuration.

SUMMARY OF THE INVENTION

It is accordingly an object of the present invention to provide a server apparatus that can continue service as it is without file replacement of a module not changed between a new and an old file, perform file replacement of only a module for adding new service, and perform a file update without involving processor changeover.

In accordance with an aspect of the present invention, there is provided a server apparatus having a function of loading a new module stored in a storing device into a main memory and changing over from an old module to the new module. The server apparatus includes a virtual server control unit disposed in a virtual server OS, for generating a virtual client OS for each module to be started stored in the storing device on the basis of a file start instruction; a boot control unit disposed in the virtual client OS, for loading the module to be started into the main memory and starting the module to be started; an identifier/module name conversion database (DB) managing unit disposed in the virtual server OS, for controlling assignment of an identifier to each module to be started, registering a relation between a module name of the module and the identifier in a first table, and performing conversion between the module name and the identifier; a routing control unit disposed in the virtual server OS, for routing a message to a module started by a different virtual client OS on the basis of an identifier of the module, the identifier being registered in the first table; and a file update control unit disposed in the virtual server OS, for requesting the routing control unit to stop communication to an old module of a module name identical with the module name of the module to be started and instructing the routing control unit to save a message to the old module and sweep out the message to the new module, on the basis of a file change instruction.

Preferably, the server apparatus further includes a communication control unit disposed in the virtual client OS, for adding to a message to a module started by another client OS an identifier of the module and sending the message to the routing control unit, and controlling reception of a message to a corresponding module on the basis of an identifier added to the message received from the routing control unit.

Further, preferably, the file update control unit instructs the identifier/module name conversion DB managing unit to change from an old identifier to a new identifier for a message to the module of the module name identical with the module name of the started module on the basis of an instruction to change to a new file, the identifier/module name conversion DB managing unit notifies all client OSes of the new identifier of the module, and the client OSes transmit a message to the module to the new module.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a diagram of structure of an Internet Protocol (IP) address/module name conversion DB in FIG. 2:

DETAILED DESCRIPTION OF THE PREFERRED EMBODIMENTS

Figure 1:
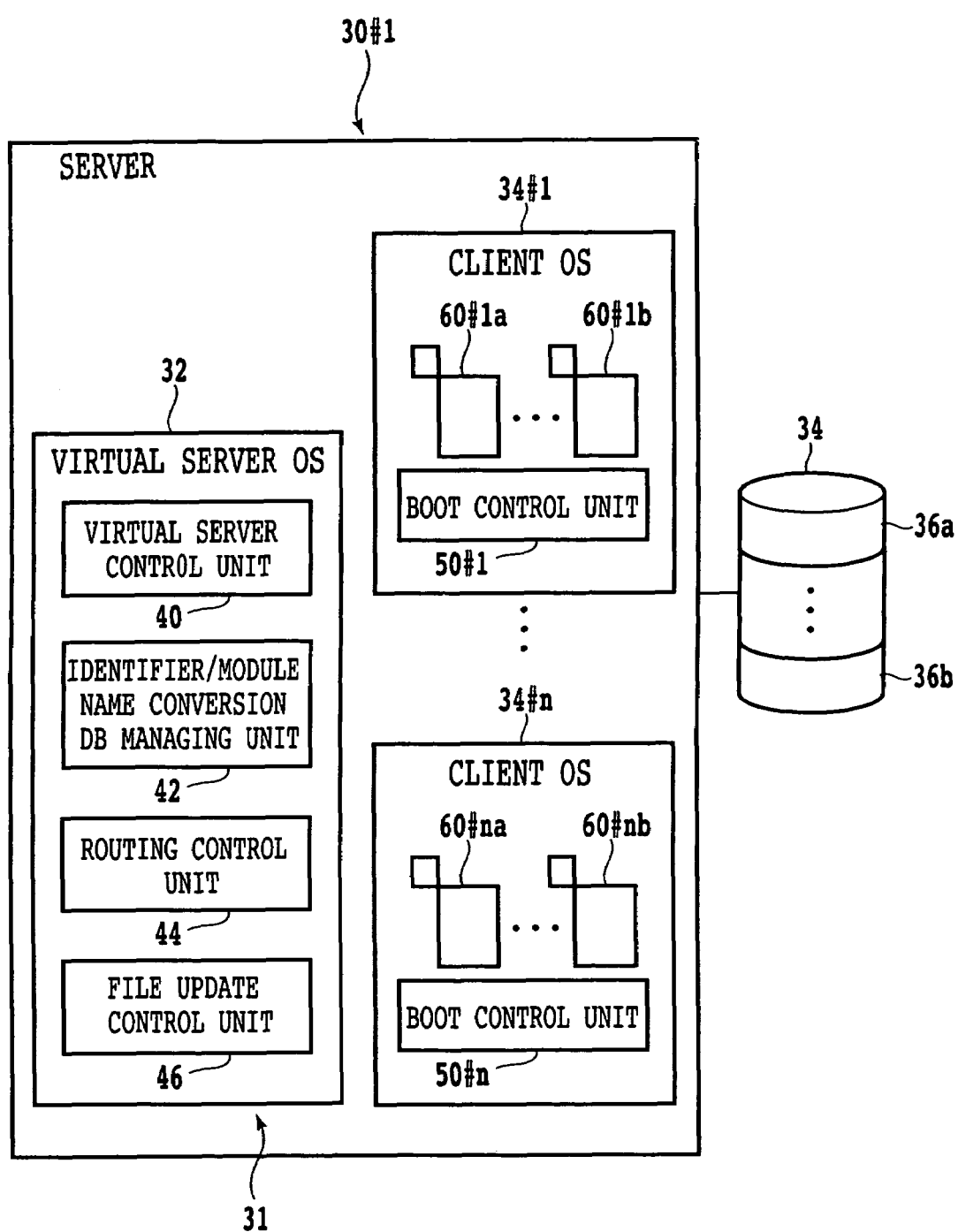
FIG. 1 is a diagram of assistance in explaining principles of the present invention.

Principles of the present invention will be described prior to description of an embodiment of the present invention. FIG. 1 is a diagram of assistance in explaining principles of the present invention. As shown in FIG. 1, a server apparatus 30 has a virtual server OS 32 loaded and operated on a main memory 31. The virtual server OS 32 includes a virtual server control unit 40, an IP address/module name conversion DB managing unit 42, and a routing control unit 44. The virtual server control unit 40 generates a virtual client OS 34#i for modules to be started 36a, 36b, . . . stored in a storing device 34 on the basis of a file start instruction. The virtual client OS 34#i includes a boot control unit 50#i. The boot control unit 50#i loads the modules to be started 36a, . . . on the main memory 31 and starts processes 60#ia, . . . . Thus, client OSes 34#i (i=1, . . . ) are generated on the main memory 31 on the basis of file start instructions.

On the basis of a module name converted by the IP address/module name conversion DB managing unit 42 from a destination IP address set in a message from the process 60#ia started by the client OS 34#i to the process 60#jb started by another client OS 34#j (j≠i), the routing control unit 44 routes the message to the client OS 34#j where the module is generated. The client OS 34#j sends the message to the module on the basis of the destination IP address, whereby inter-process communication is performed and each of the processes 60#ia. . . Operates. Suppose that a new module 60#2a is an upgraded version of an old module 60#1a and that a new module 60#2b is an additional module.

On the basis of a file change instruction, a file update control unit 46 requests the routing control unit 44 to stop communication to the old module 60#1a of a module name identical with that of the module 60#2a to be started and instructs the routing control unit 44 to save messages to the old module 60#1a and sweep out the messages to the new module 60#2a. According to the instruction from the file update control unit 46, the routing control unit 44 saves messages to the old module 60#1a and then sweeps out the messages to the new module 60#2a. Thus, since the messages to the old module 60#1a are delivered to the new module 60#2a, the new module 60#2a can be continued without stopping operation of the old module 60#1a.

Figure 2:
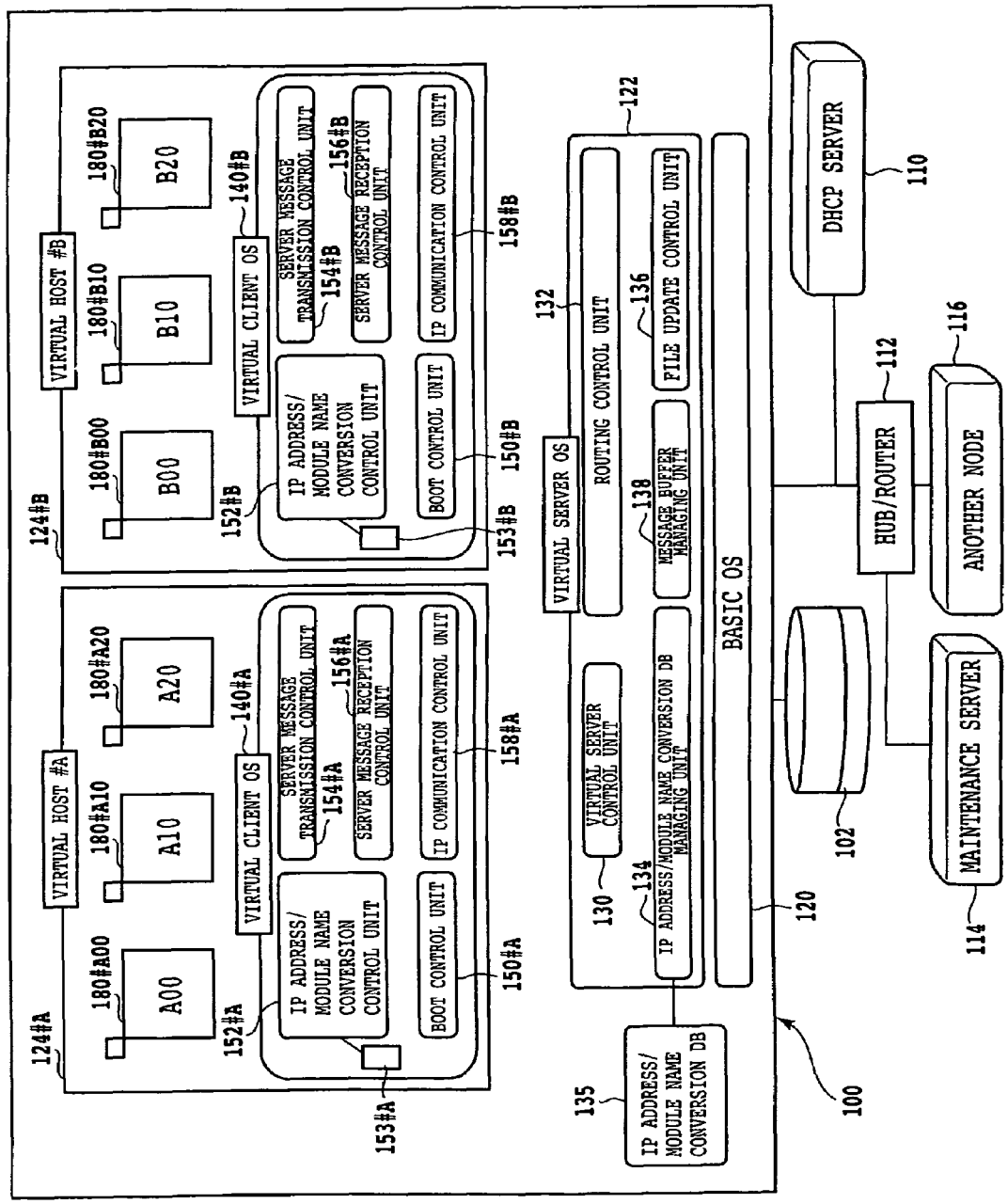
FIG. 2 is a diagram of configuration of a server apparatus according to an embodiment of the present invention.

FIG. 2 is a diagram of configuration of a server according to an embodiment of the present invention. As shown in FIG. 2, the server includes a main unit apparatus 100 and peripheral devices such as a disk device 102 and the like. The main unit apparatus includes a Control Processing Unit (CPU), a main memory, a Read Only Memory (ROM), and the like. A basic OS 120 and a virtual server OS 122 are loaded on the main memory and are executed by the CPU. A virtual host 124#i (i=A, B, . . .) Is generated for each application group, which operates on the server, to be started. The application group to be started refers to one or a plurality of application modules specified by a maintenance server 114 as modules to be started at a time of a start of a file. The basic OS 120 is an operating system for performing process management, file management, window control, and the like. The server 100 is connected with a Dynamic Host Configuration Protocol (DHCP) server 110 as well as the maintenance server 114 and another node 116 via a communication device such as a HUB/router 112 or the like. The virtual server OS 122 includes a virtual server control unit 130, a routing control unit 132, an IP address/module name conversion DB managing unit 134, a file update control unit 136, and a message buffer managing unit 138. The virtual server control unit 130 and the like are program modules.

The virtual server control unit 130 has the following functions. (i) When receiving a message to "start a new file" from the file update control unit 136, the virtual server control unit 130 constructs an environment of a new virtual host 124#i to start a module included in the new file.

Specifically, the virtual server control unit 130 loads and starts a module including functional blocks such as a BOOT control unit 150#i, an IP address/module name conversion control unit 152#i, a server message transmission control unit 154#i, and the like constituting a virtual client OS 140#i. The virtual server control unit 130 further copies an IP address/module name conversion DB 135 and thereby generates an IP address/module name conversion table 153#i. (ii) The virtual server control unit 130 notifies the virtual client OS 140#i of the name of the module to be started included in the new file. (iii) When receiving a response to "start the new file" from the virtual client OS 140#i, the virtual server control unit 130 notifies the file update control unit 136 of the response. (iv) When receiving a request to delete an IP address of an old module from the file update control unit 136, the virtual server control unit 130 deletes a process of the old module. Also, the virtual server control unit 130 determines whether only one old module is present within the virtual host, and when only one old module is present within the virtual host, the virtual server control unit 130 deletes the virtual host.

The routing control unit 132 has the following functions. (i) When receiving a message from a virtual host 124#i, the routing control unit 132 extracts a destination IP address in an IP header of the message, inquires of the IP address/module name conversion DB managing unit 134 about a module corresponding to the IP address, and then sends the message to a virtual host corresponding to the module. (ii) When receiving a request to inhibit communication to an IP address of an old module from the file update control unit 136, the routing control unit 132 saves messages to the IP address to the message buffer managing unit 138. (iii) When receiving a notification of "sweep out the messages" from the file update control unit 136, the routing control unit 132 reads the messages saved to the message buffer managing unit 138 and requests the IP address/module name conversion DB managing unit 134 to convert from the old IP address to a new IP address. Receiving a new IP address from the IP address/module name conversion DB managing unit 134, the routing control unit 132 updates the destination address in IP headers of the read messages to the new IP address. The routing control unit 132 outputs the messages to a virtual host corresponding to the IP address.

The IP address/module name conversion DB managing unit 134 has the following functions. (i) When receiving a destination IP address from the routing control unit 132, the managing unit 134 converts the IP address to a module name and then notifies the routing control unit 132 of the module name. (ii) When receiving a request to give an IP address to a module to be started from a virtual client OS, the managing unit 134 requests the DHCP server 110 to dispense an IP address. On the basis of the dispensed IP address, the managing unit 134 stores the IP address, a name of the module to be started, and a state "new" in the IP address/module name conversion DB 135. The managing unit 134 notifies the requesting virtual client OS of a correspondence between the dispensed IP address and the name of the module to be started. (iii) When receiving a "notification to change an IP address" from the file update control unit 136, the managing unit 134 notifies all virtual hosts to transmit messages to the new IP address rather than an old IP address regarding a module of the module name identical with that of the module to be started. (iv) When receiving a notification of "establish the new IP address" from the file update control unit 136, the managing unit 134 changes the state of the new IP address in the IP address/module name conversion DB 135 from "new" to "current." The managing unit 134 deletes old IP address/module name correspondence data from the IP address/module name conversion DB 135. The managing unit 134 returns a response to the file update control unit 136.

FIG. 3 is a diagram of structure of the IP address/module name conversion DB 135 in FIG. 2. As shown in FIG. 3, the IP address/module name conversion DB 135 includes IP address, module name, and state fields. The IP address is an IP address of a module of a corresponding module name. The state is a state of a corresponding module and is "new"/"current." "Current" indicates that the module is currently operational. "New" indicates a state during a period from a "start of a new file" to "establishment of the new file." If a defective condition occurs in the started module during this period, the started module is stopped and deleted to return to a state before the start of the started module.

The file update control unit 136 has the following functions. (i) When receiving a message to "start a new file" from the maintenance server 114, the file update control unit 136 refers to the new file (module to be started) stored in the disk device 102 and notifies the virtual server control unit 130 of the module to be started. (ii) When receiving a response to the start of the "new file" from the virtual server control unit 130, the file update control unit 136 returns a response to the maintenance server 114. (iii) When receiving a message to "change to the new file" from the maintenance server 114, the file update control unit 136 refers to the new file (module to be started) stored in the disk device 102 and requests the IP address/module name conversion DB managing unit 134 to convert from an old module name to an old IP address of a module with a module name identical with that of the module to be started. The file update control unit 136 makes a "request to inhibit communication due to file replacement" of messages to the converted IP address to the routing control unit 132. The file update control unit 136 makes a "request to stop communication due to file replacement" to a virtual client OS of the old module of the IP address. (iv) The file update control unit 136 provides an "IP address change notification" regarding the old IP address to the IP address/module name conversion DB managing unit 134. (v) When receiving a response from the IP address/module name conversion DB managing unit 134, the file update control unit 136 provides a "notification of sweep out messages" to the routing control unit 132. When receiving a response from the routing control unit 132, the file update control unit 136 returns a response to the message to "change to the new file" to the maintenance server 114. (vi) When receiving a notification of a message to "establish the new file" from the maintenance server 114, the file update control unit 136 notifies the IP address/module name conversion DB managing unit 134 of "establish the new IP address". When receiving a response from the IP address/module name conversion DB managing unit 134, the file update control unit 136 requests the virtual server control unit 130 to "delete" the IP address of the old module. (vii) When receiving a response from the virtual server control unit 130, the file update control unit 136 returns a response to the message to "establish the new file" to the maintenance server 114.

The message buffer managing unit 138 has the following functions. (i) When receiving a message from the routing control unit 132, the message buffer managing unit 138 stores the message in a buffer. (ii) When receiving a request to read the message from the routing control unit 132, the message buffer managing unit 138 reads the message stored in the buffer.

A virtual client OS 140#i includes a BOOT control unit 150#i, an IP address/module name conversion control unit 152#i, a server message transmission control unit 154#i, a server message reception control unit 156#i, and an IP communication control unit 158#i.

The BOOT control unit 150#i has the following functions. (i) According to a notification from the virtual server OS 122, the BOOT control unit 150#i reads a module to be started from the disk device 102 and loads the module to be started into a space within the virtual host 124#i. (ii) The BOOT control unit 150#i notifies the IP address/module name conversion control unit 152#i of a name of the loaded module to be started. After completion of the operations (i) and (ii), the BOOT control unit 150#i returns a response to the file update control unit 136 via the virtual server control unit 130.

The IP address/module name conversion control unit 152#i has the following functions. (i) When receiving a notification of a module to be started from the BOOT control unit 150#i, the IP address/module name conversion control unit 152#i notifies the IP address/module name conversion DB managing unit 134 of a name of the module to be started. The module to be started is an additional module, an upgraded module, or the like. When a module of the same name is present in another virtual host, there may be no module of the same name such as an additional module in another virtual host. When there is already such a module, a new IP address is given to change communication to the module. When there is no such module, an IP address is given to a new additional module. (ii) When receiving IP address/module name correspondence data from the IP address/module name conversion DB managing unit 134, the IP address/module name conversion control unit 152#i stores the data in the IP address/module name conversion table 153#i. (iii) When receiving an instruction for an update to a new IP address from the IP address/module name conversion DB managing unit 134, the IP address/module name conversion control unit 152#i deletes old module name/old IP address correspondence data of a module identical with a module corresponding to the new IP address so that communication is performed to the new module of the new IP address.

The IP address/module name conversion table 153#i is substantially the same as the IP address/module name conversion DB 135 shown in FIG. 3. The server message transmission control unit 154#i has the following functions. (i) When receiving a name of a destination module and a message from a module, the server message transmission control unit 154#i inquires of the IP address/module name conversion control unit 152#i about whether the destination module is present within the virtual host 124#i to which the server message transmission control unit 154#i belongs. (ii) When the destination module is present within the virtual host 124#i, the server message transmission control unit 154#i sends the data packet to the module within the virtual host. (iii) When the destination module is not present within the virtual host 124#i, the server message transmission control unit 154#i sends the data packet to the IP communication control unit 158#i.

The IP communication control unit 158#i has the following functions. (i) When receiving a name of a destination module and a message from the server message transmission control unit 154#i, the IP communication control unit 158#i inquires of the IP address/module name conversion control unit 152#i about an IP address corresponding to the name of the destination module. The IP communication control unit 158#i adds the destination IP address to the message and then transmits the message to the routing control unit 132. (ii) When receiving a message from the routing control unit 132, the IP communication control unit 158#i inquires of the IP address/module name conversion control unit 152#i about a name of a destination module corresponding to a destination IP address in the message. The IP communication control unit 158#i sends the name of the destination module and the message to the server message reception control unit 156#i.

The server message reception control unit 156#i has the following functions. When receiving the name of the destination module and the message from the IP communication control unit 158#i, the server message reception control unit 156#i notifies the destination module of the message receiving event and sends the data packet to the destination module. Each module within the virtual host 124#i operates as a process under control of the above-described virtual client OS 140#i in communication with the basic OS 120 and other modules.

The DHCP server 110 dynamically assigns an IP address to a module according to a request to give an IP address. The HUB/router 112 routes a message at a data link layer or IP layer level. The maintenance server 114 transfers a new file to the server, transmits messages to "start the new file," "change to the new file," and "establish the new file" to the server, and receives responses to these messages from the server.

Operations of FIG. 2 will be described in the following.

(1) Inter-Process Communication

Figure 4:
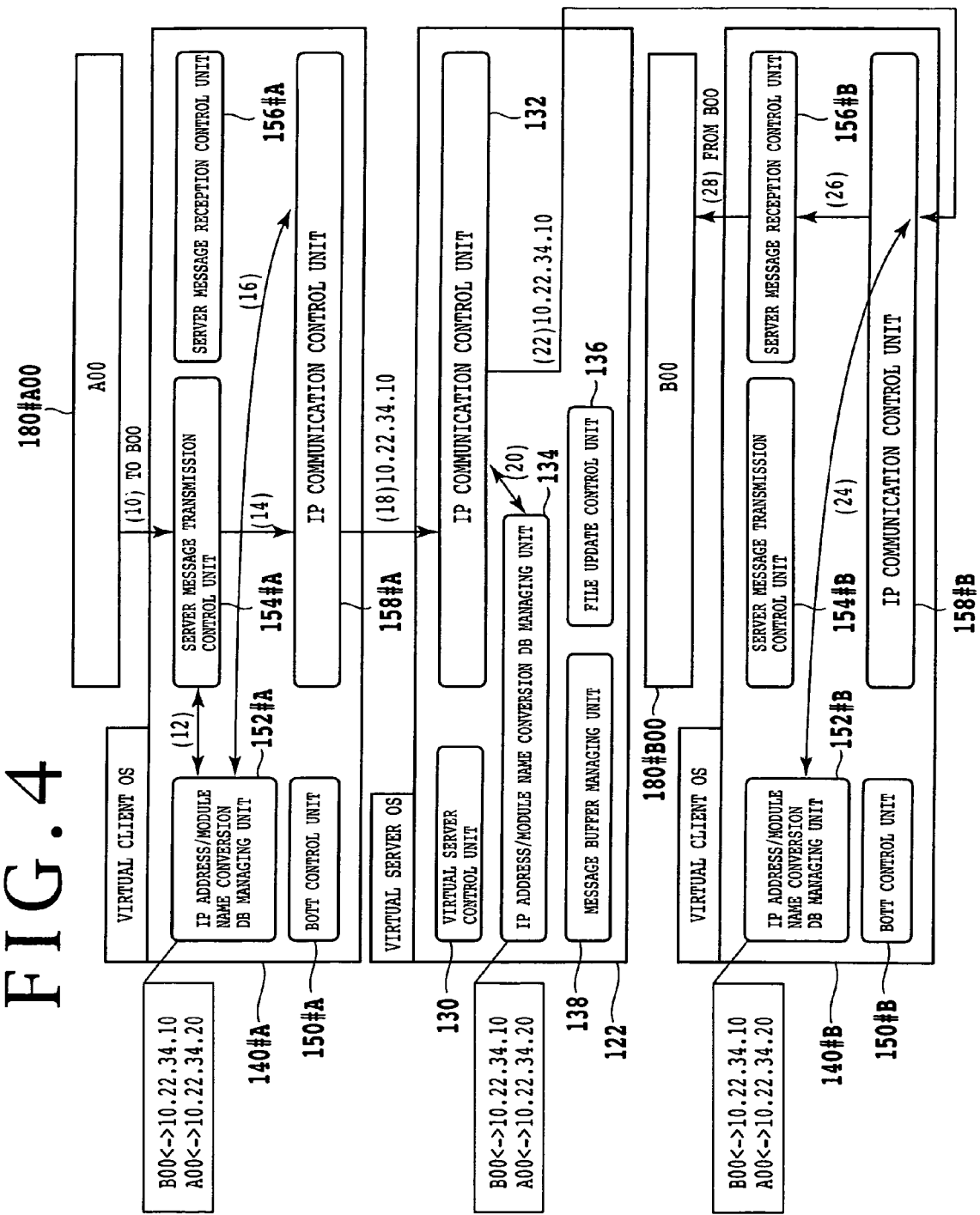
FIG. 4 is a diagram of inter-process communication.

FIG. 4 is a diagram showing inter-process communication. Suppose that as shown in FIG. 4, virtual hosts 124#A and 124#B are started by a new file start method to be described later. Description will be made by taking as an example a case of communication from a process 180#A00 in the virtual host 124#A to a process 180#B00 in the virtual host 124#B. As indicated by (10), the process 180#A00 outputs a destination module name B00 and a message to a server message transmission control unit 154#A. As indicated by (12), the server message transmission control unit 154#A inquires of an IP address/module name conversion control unit 152#A about whether the module B00 is present within the virtual host 124#A. The IP address/module name conversion control unit 152#A searches an IP address/module name conversion table 153#A and then notifies the server message transmission control unit 154#A that the module B00 is not present within the virtual host 124#A. As indicated by (14), the server message transmission control unit 154#A outputs the module name B00 and the message to an IP communication control unit 158#A. As indicated by (16), the IP communication control unit 158#A inquires of the IP address/module name conversion control unit 152#A about an IP address of the module name B00. The IP address/module name conversion control unit 152#A notifies the IP communication control unit 158#A of the IP address 10. 22. 34. 10 of the module name B00. The IP communication control unit 158#A adds the IP address 10. 22. 34. 10 to the message and then sends the message to the routing control unit 132, as indicated by (18).

As indicated by (20), the routing control unit 132 inquires of the IP address/module name conversion DB managing unit 134 about a virtual host where the module B00 of the IP address 10. 22. 34. 10 is present. The IP address/module name conversion DB managing unit 134 notifies the routing control unit 132 that the module B00 of the IP address 10. 22. 34. 10 is controlled by a virtual client OS 140#B. As indicated by (22), the routing control unit 132 sends the IP packet with the destination IP address 10. 22. 34. 10 to an IP communication control unit 158#B of the virtual client OS 140#B. As indicated by (24), the IP communication control unit 158#B inquires of an IP address/module name conversion control unit 152#B about the module name of the IP address 10. 22. 34. 10. The IP address/module name conversion control unit 152#B notifies the IP communication control unit 158#B that the module name is B00. As indicated by (26), the IP communication control unit 158#B sends the module name B00 and the message to a server message reception control unit 156#B. As indicated by (28), the server message reception control unit 156#B sends the message to the module 180#B00.

(2) Transfer of New File

Figure 5:
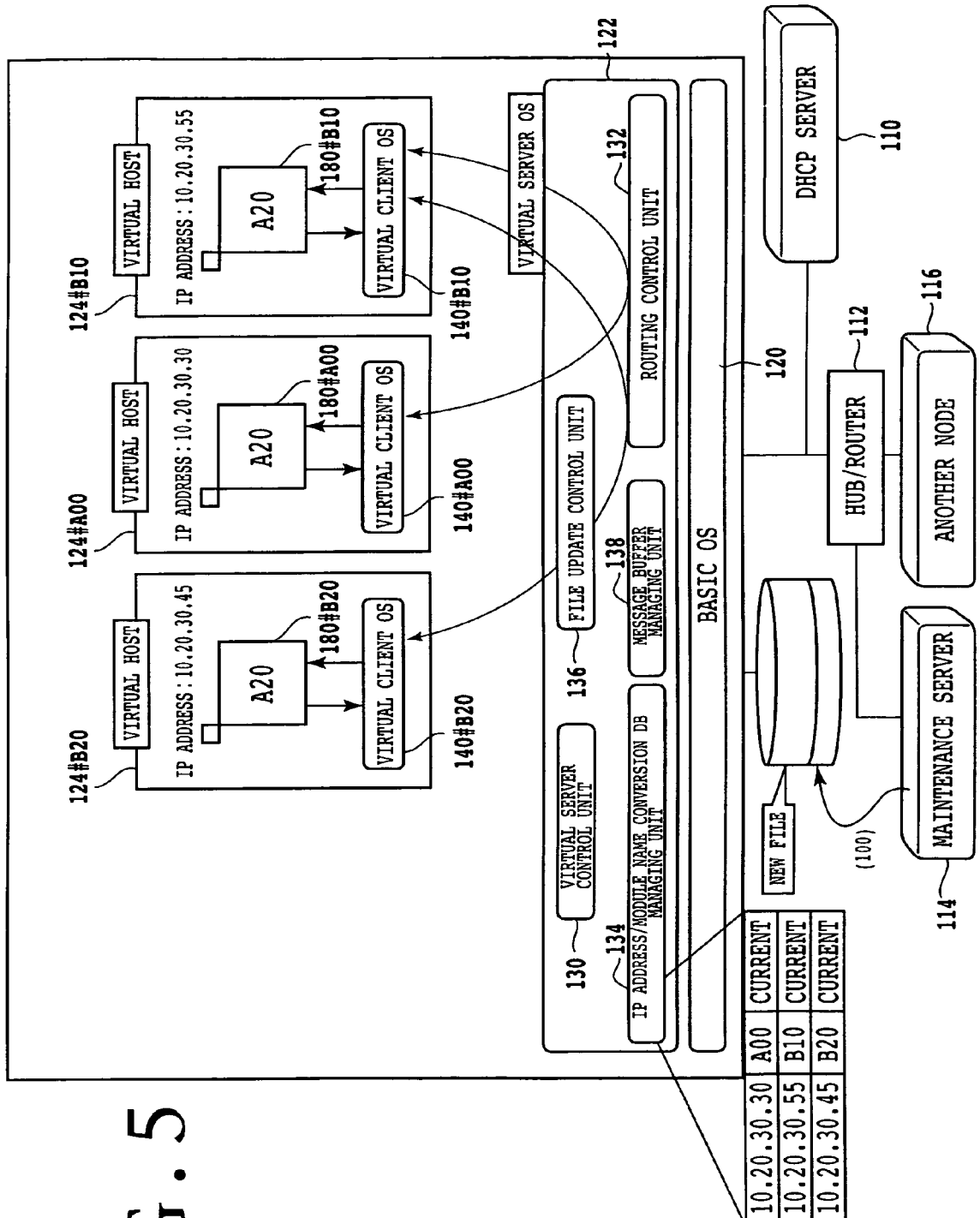
FIG. 5 is a diagram of transfer of new files.

FIG. 5 is a diagram showing transfer of a new file. In this case, suppose that virtual hosts 124#B20, 124#A00, and 124#B10 are started by a new file start to be described later, and that data such as IP address 10.20.30.30/module A00/"current" and the like is registered in the IP address/module name conversion DB 135. As indicated by (100), the maintenance server 114 transfers new files, for example B00 and B10 to a new file storing area on the disk device 102 of the server 100 via the HUB/router 112.

(3) Starting of New Files

Figure 6:
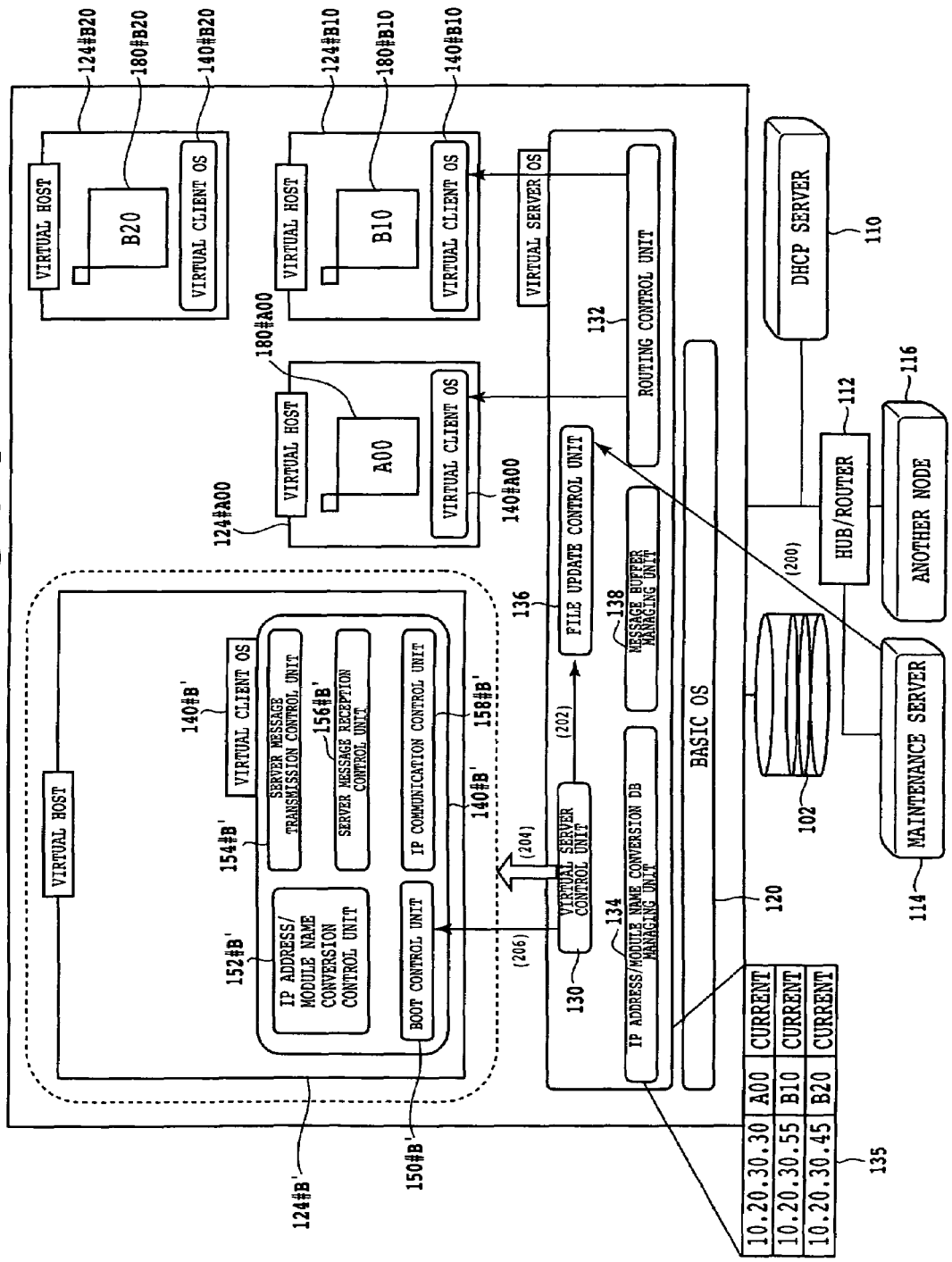
FIG. 6 is a diagram of starting of the new files.
Figure 7:
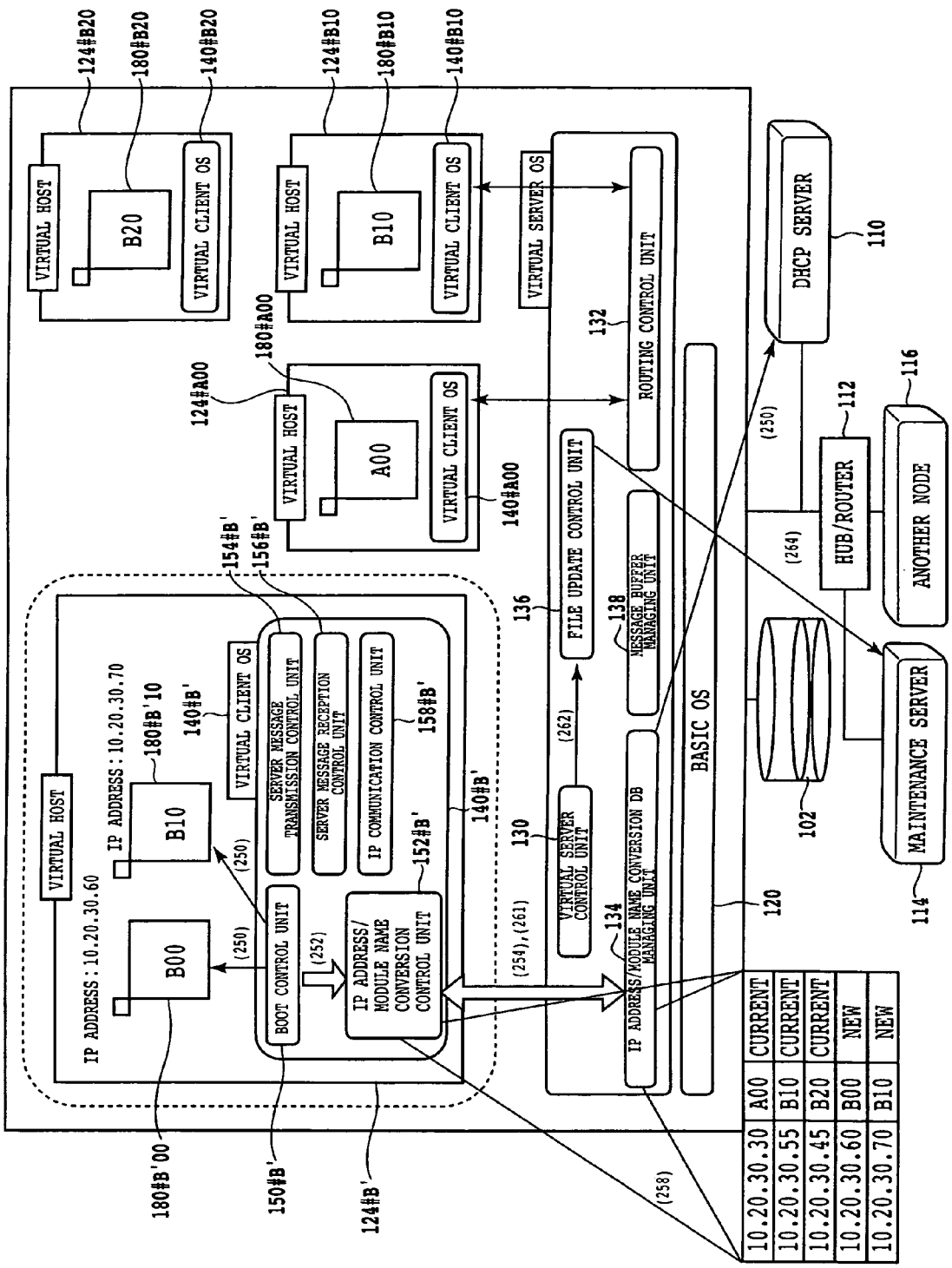
FIG. 7 is a diagram of starting of the new files.

FIG. 6 and FIG. 7 are diagrams showing starting of new files. In this case, suppose that virtual hosts 124#A00, 124#B10, and 124#B20 for modules 180#A00, 180#B10, and 180#B20 are already started, and that the modules to be started B00 and B10 stored on the disk device 102 will be started. Suppose that the module to be started B00 is an additional module and that the module B10 is an upgraded version of the module 180#B10.

As indicated by (200), the maintenance server 114 notifies the file update control unit 136 of a "new file starting" message for the new files B00 and B10. As indicated by (202), the file update control unit 136 notifies the virtual server control unit 130 of the modules to be started B00 and B10 stored on the disk device 102. As indicated by (204), the virtual server control unit 130 constructs an environment of a virtual host 124#B'.

As indicated by (206), the virtual server control unit 130 notifies a BOOT control unit 150#B' of the modules to be started (B00 and B10). The BOOT control unit 150#B' reads the new modules to be started B00 and B10 from the disk device 102, loads the new modules to be started B00 and B10 into a space within the virtual host 124#B', and generates processes 180#B'00 and 180#B'10, as indicated by (250) in FIG. 7.

As indicated by (252), the BOOT control unit 150#B' notifies an IP address/module name conversion control unit 152#B' of the started modules B00 and B10. As indicated by (254), the IP address/module name conversion control unit 152#B' makes a request to give an IP address to the started modules B00 and B10 to the IP address/module name conversion DB managing unit 134. As indicated by (256), the IP address/module name conversion DB managing unit 134 requests the DHCP server 110 to dispense an IP address to the started modules B00 and B10. The DHCP server 110 notifies the IP address/module name conversion DB managing unit 134 of IP addresses 10.20.30.60 and 10.20.30.70 of the started modules B00 and B10. As indicated by (258), the IP address/module name conversion DB managing unit 134 registers started modules B00 and B10/IP addresses 10.20.30.60 and 10.20.30.70/"new" and "new" in the IP address/module name conversion DB 135.

As indicated by (260), the IP address/module name conversion DB managing unit 134 notifies the IP address/module name conversion control unit 152#B' of started modules B00 and B10/IP addresses 10.20.30.60 and 10.20.30.70/"new" and "new". The IP address/module name conversion control unit 152#B' registers started modules B00 and B10/IP addresses 10.20.30.60 and 10.20.30.70/"new" and "new" in an IP address/module name conversion table 153#B'. As indicated by (262), the BOOT control unit 150#B' returns a response to the file update control unit 136 via the virtual server control unit 130. As indicated by (264), the file update control unit 136 returns a response to "new file starting" to the maintenance server 114.

(4) Change to New Files

Figure 8:
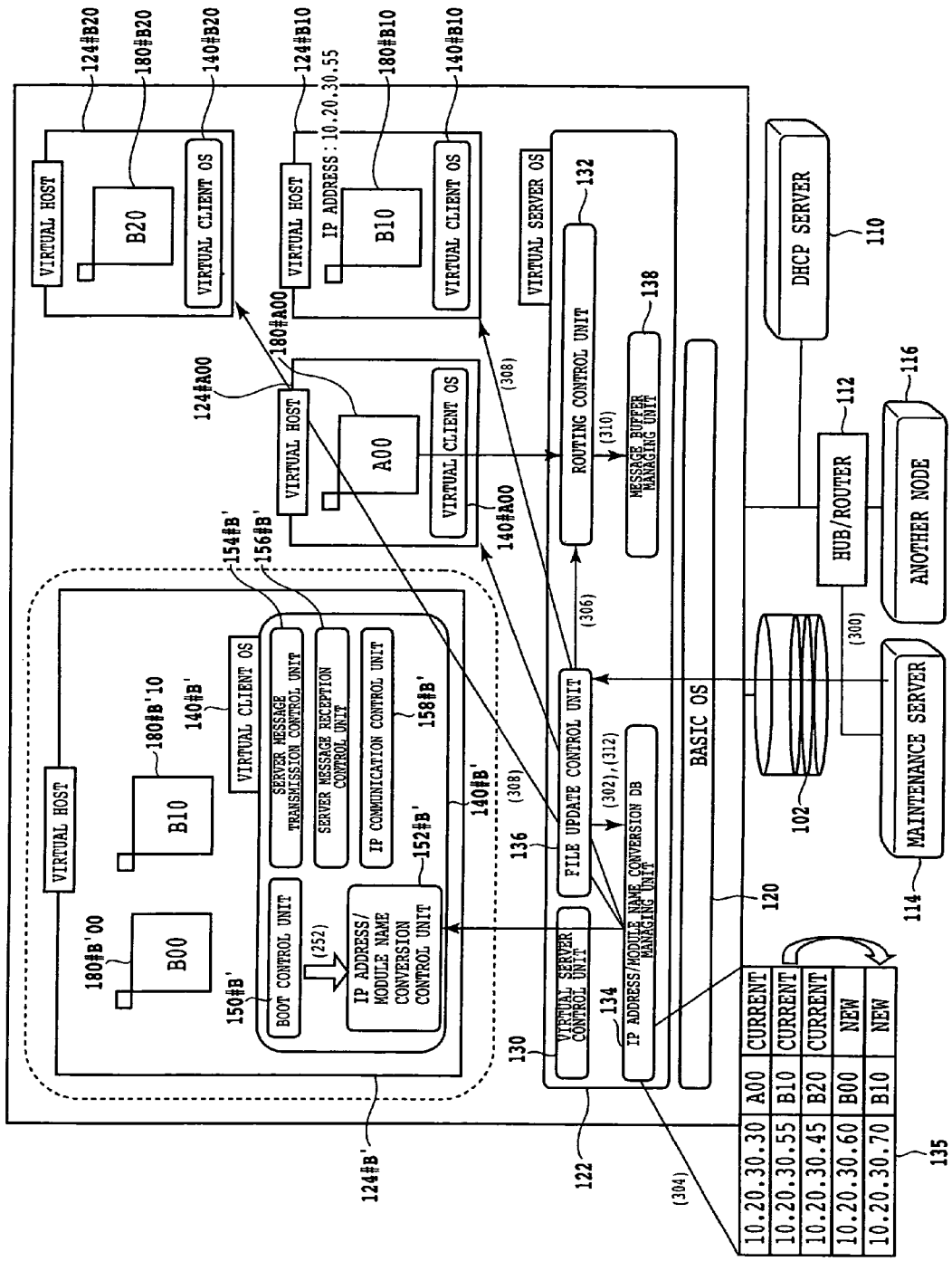
FIG. 8 is a diagram of change to the new files.
Figure 9:
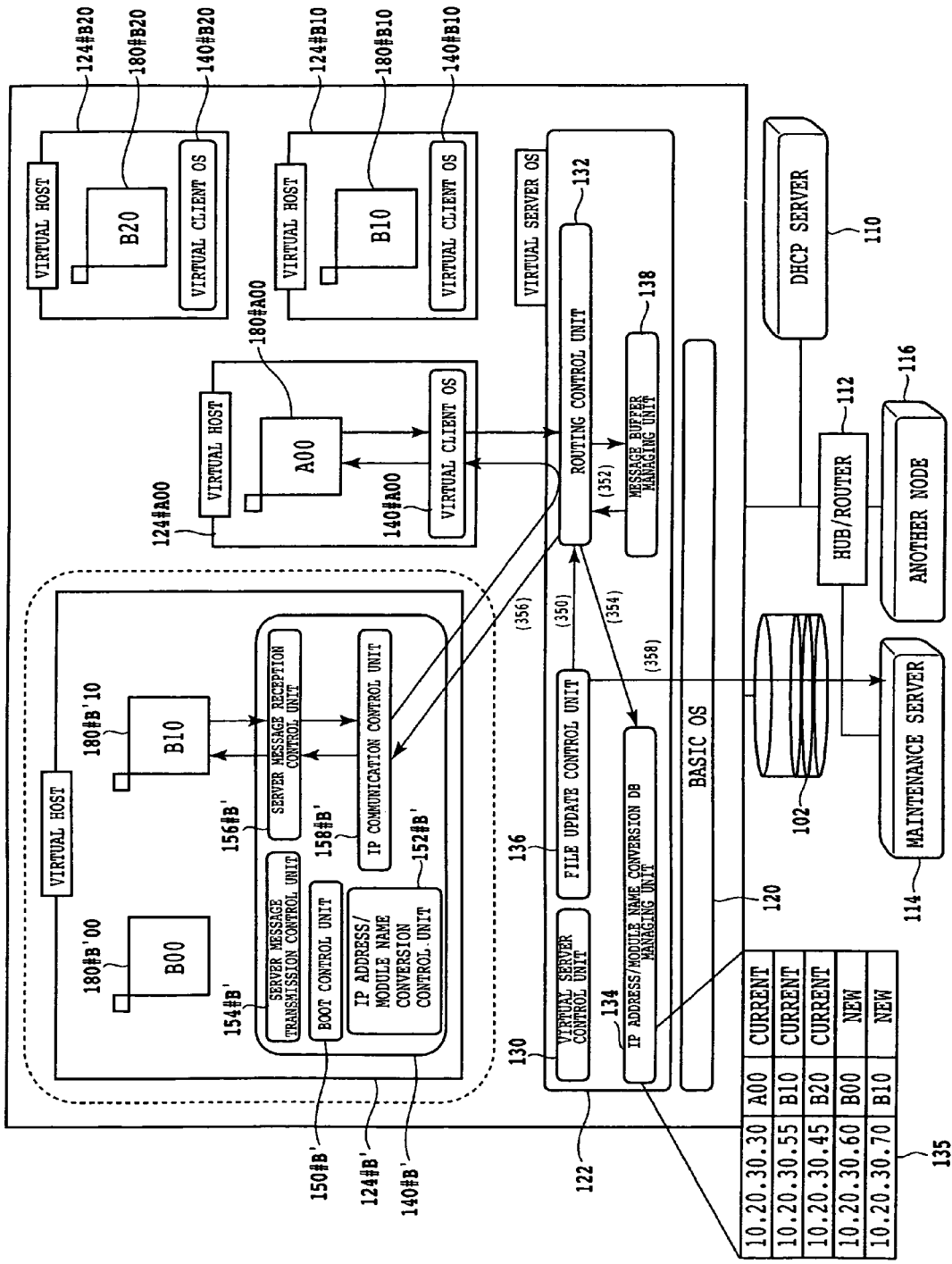
FIG. 9 is a diagram of change to the new files.

FIG. 8 and FIG. 9 are diagrams showing change to the new files. As indicated by (300) in FIG. 8, the maintenance server 114 notifies the file update control unit 136 of a message to "change to the new files". The file update control unit 136 refers to the disk device 102 and inquires of the IP address/module name conversion DB managing unit 134 about the IP address of the already started module B10 as a module of the identical name with that of the module to be started B00 or B10. As indicated by (304), the IP address/module name conversion DB managing unit 134 refers to the IP address/module name conversion DB 135, and then notifies the file update control unit 136 of the IP address 10.20.30.55 of the module name B10.

As indicated by (306), the file update control unit 136 requests the routing control unit 132 to inhibit communication regarding the IP address 10.20.30.55. As indicated by (308), the file update control unit 136 requests the process 180#B10 corresponding to the IP address 10.20.30.55 to stop operation due to file change.

As indicated by (310), the routing control unit 132 saves messages having the IP address 10.20.30.55 as destination to the message buffer managing unit 138. The process 180#B10 stops operation. As indicated by (312), the file update control unit 136 notifies the IP address/module name conversion DB managing unit 134 of change of IP addresses of the started modules B00 and B10. The IP address/module name conversion DB managing unit 134 notifies all virtual client OSes 140#i (i=B, A00 . . . ) of the IP addresses 10.20.30.60 and 10.20.30.70 of the started modules B00 and B10 and gives an instruction to update the module B10 of the identical module name with that of the started module to the new IP address 10.20.30.70 to all virtual client OSes 140#i (i=B, A00 . . . ). The virtual client OS 140#i registers IP addresses 10.20.30.60 and 10.20.30.70/started modules B00 and B10 correspondence data and performs an update to the new IP address 10.20.30.70 by deleting IP address/module name correspondence data of the old module B10. A response is returned to the file update control unit 136.

As indicated by (350) in FIG. 9, the file update control unit 136 notifies the routing control unit 132 of "weep out messages." As indicated by (352), the routing control unit 132 reads IP packets saved to the message buffer managing unit 138. As indicated by (354), the routing control unit 132 makes an IP address conversion request to the IP address/module name conversion DB managing unit 134 to have the IP address/module name conversion DB managing unit 134 dispense the new IP address 10.20.30.70 of the destination IP address of the IP packets. As indicated by (356), the routing control unit 132 sets the new IP address in the messages and sends the messages to an IP communication control unit 158#B' within an virtual client OS 140#B' for the started module B10 of the new IP address 10.20.30.70.

The IP communication control unit 158#B' inquires of the IP address/module name conversion control unit 152#B' about the module name corresponding to the destination IP address 10.20.30.70 of the messages. The IP address/module name conversion control unit 152#B' notifies of the module name B10 corresponding to the IP address 10.20.30.70. The IP communication control unit 158#B' sends the module name B10 and the messages to a server message reception control unit 156#B'. The server message reception control unit 156#B' sends the messages to the process 180#B'10.

When completing processing indicated by (352) and (356) on all the messages saved to the message buffer managing unit 138, the routing control unit 132 returns a response to the file update control unit 136. As indicated by (358), the file update control unit 136 returns a response to the message to "change to the new files" to the maintenance server 114.

(5) Establishment of New Files

Figure 10:
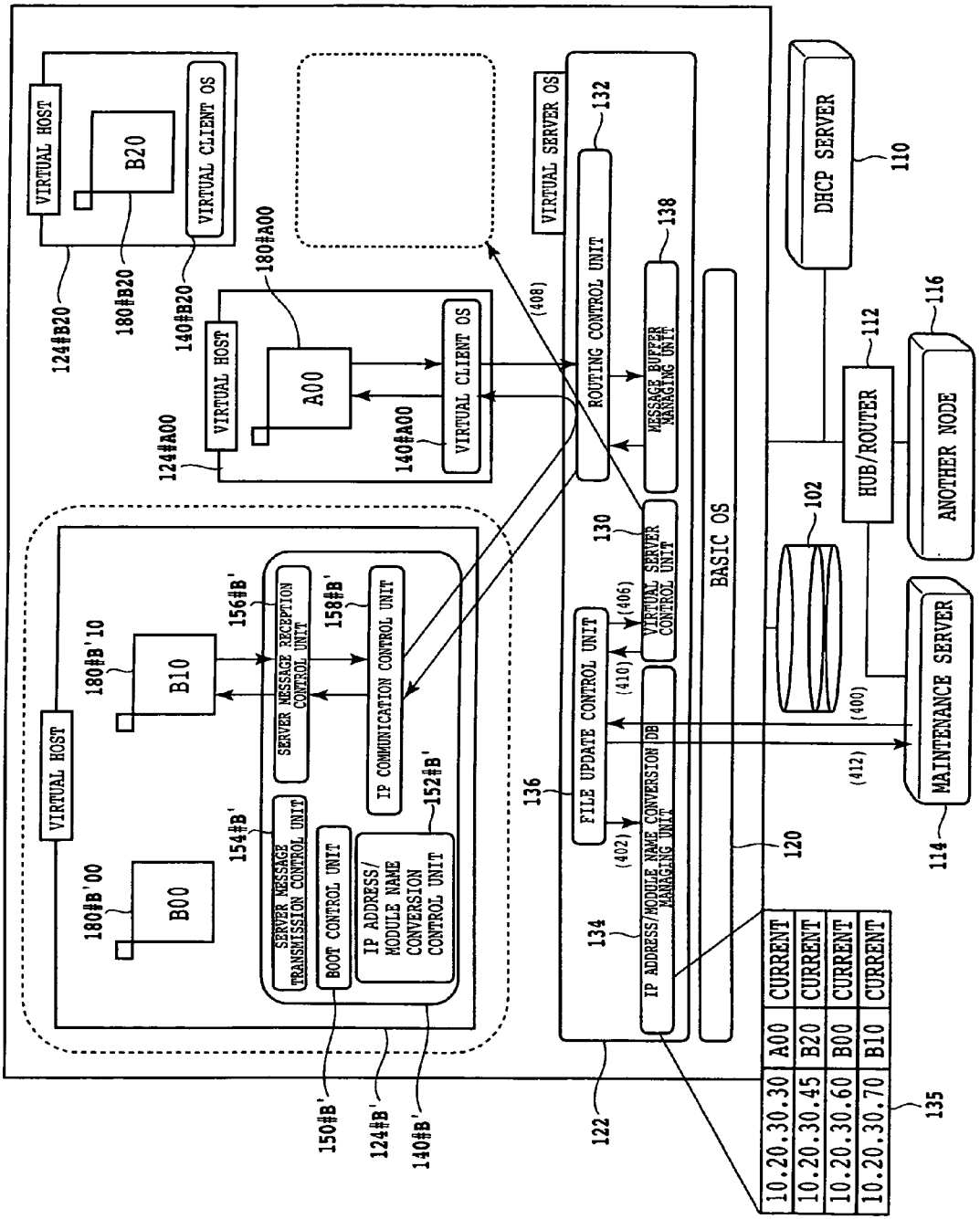
FIG. 10 is a diagram of establishment of the new files.
Figure 11:
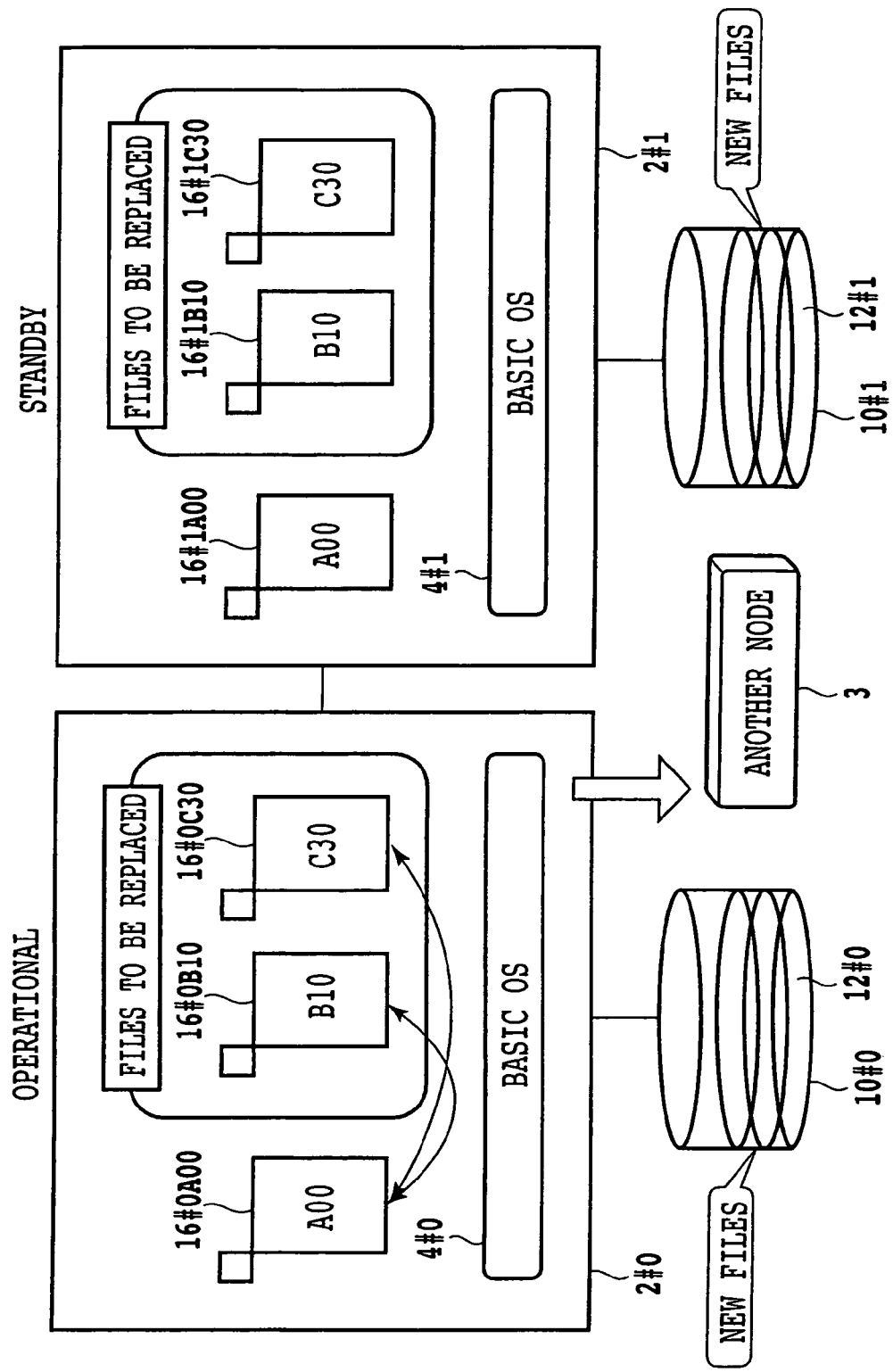
FIG. 11 is a diagram of conventional loading of new files.
Figure 12:
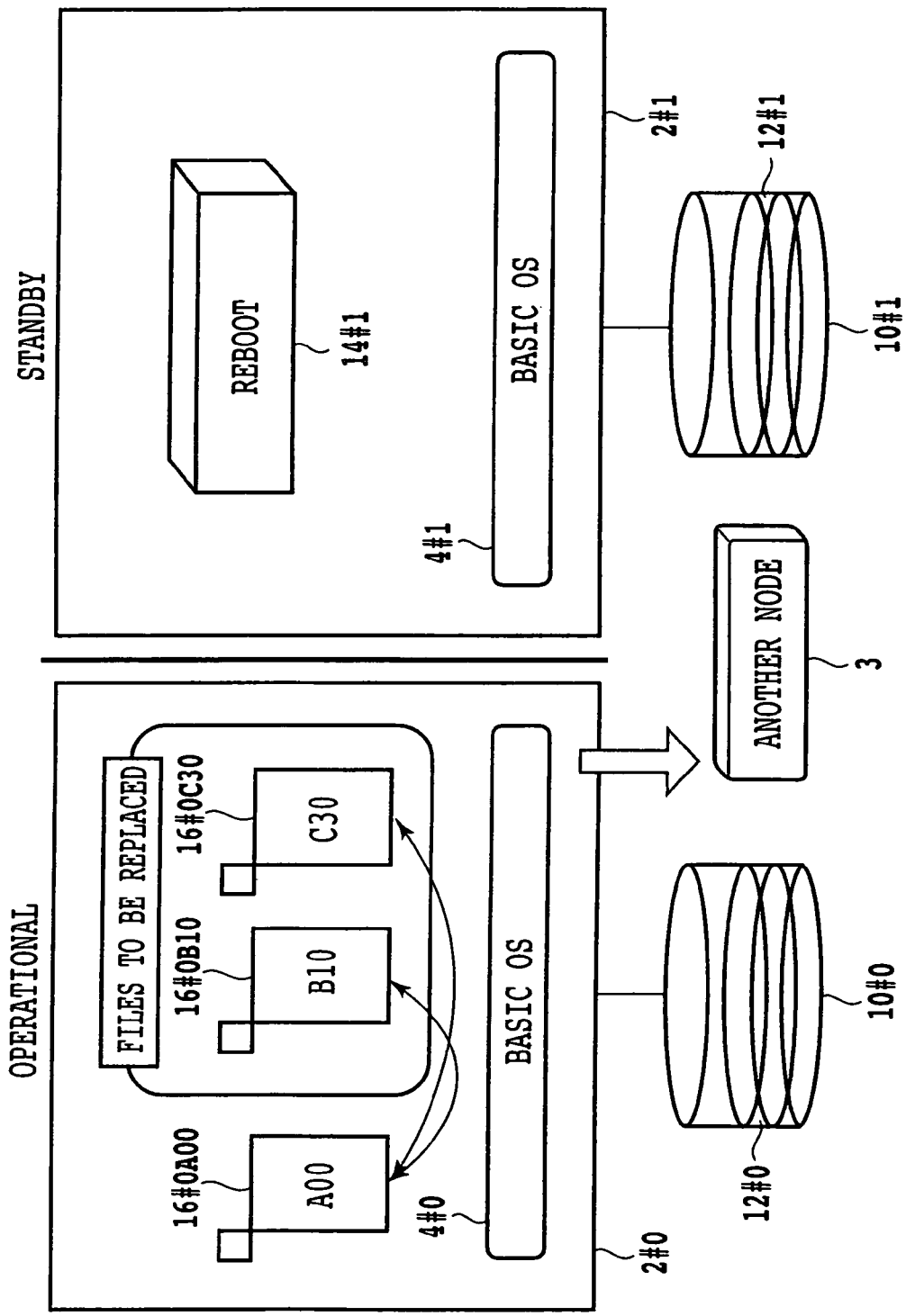
FIG. 12 is a diagram of conventional booting of the new files.
Figure 13:
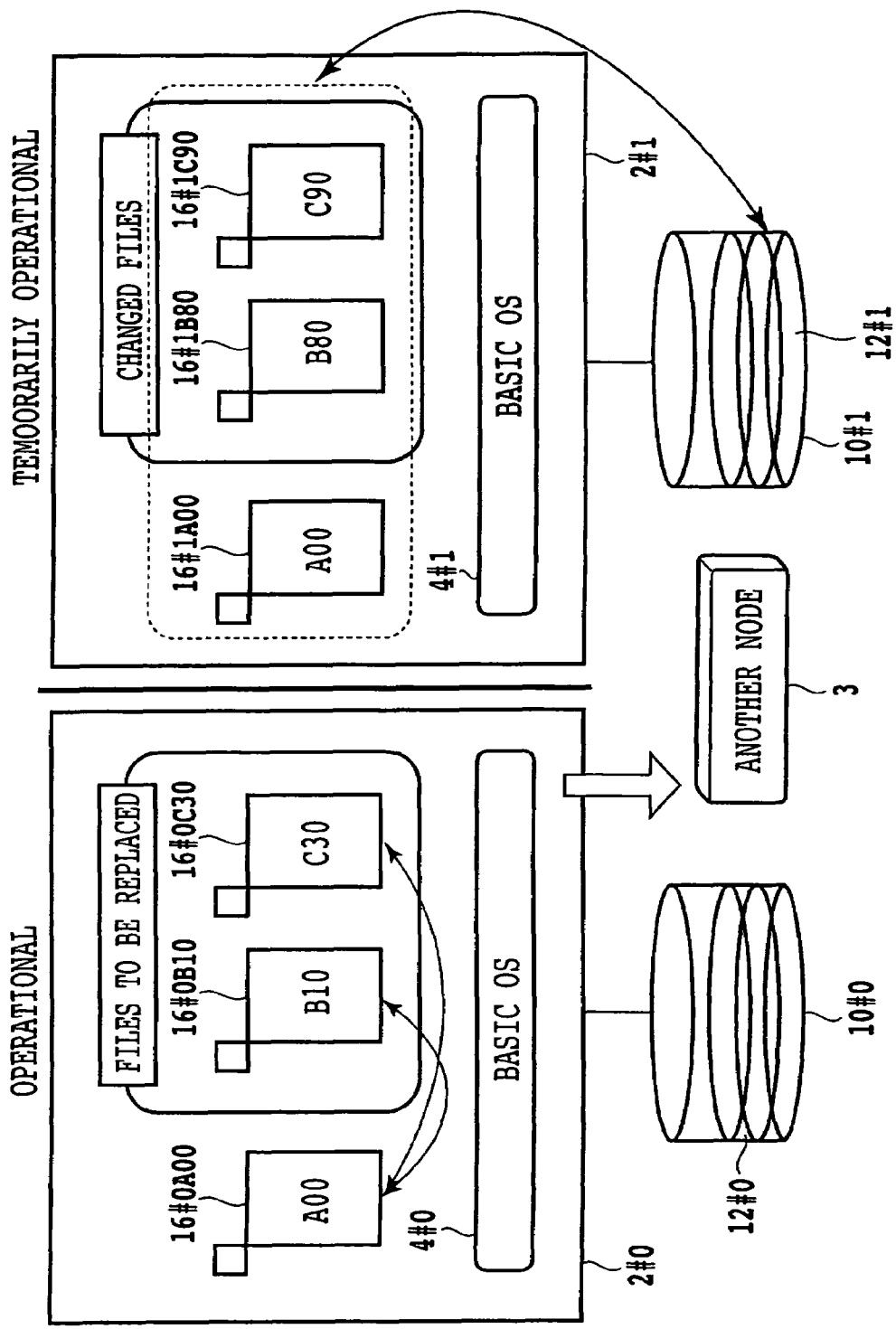
FIG. 13 is a diagram of conventional booting of the new files.
Figure 14:
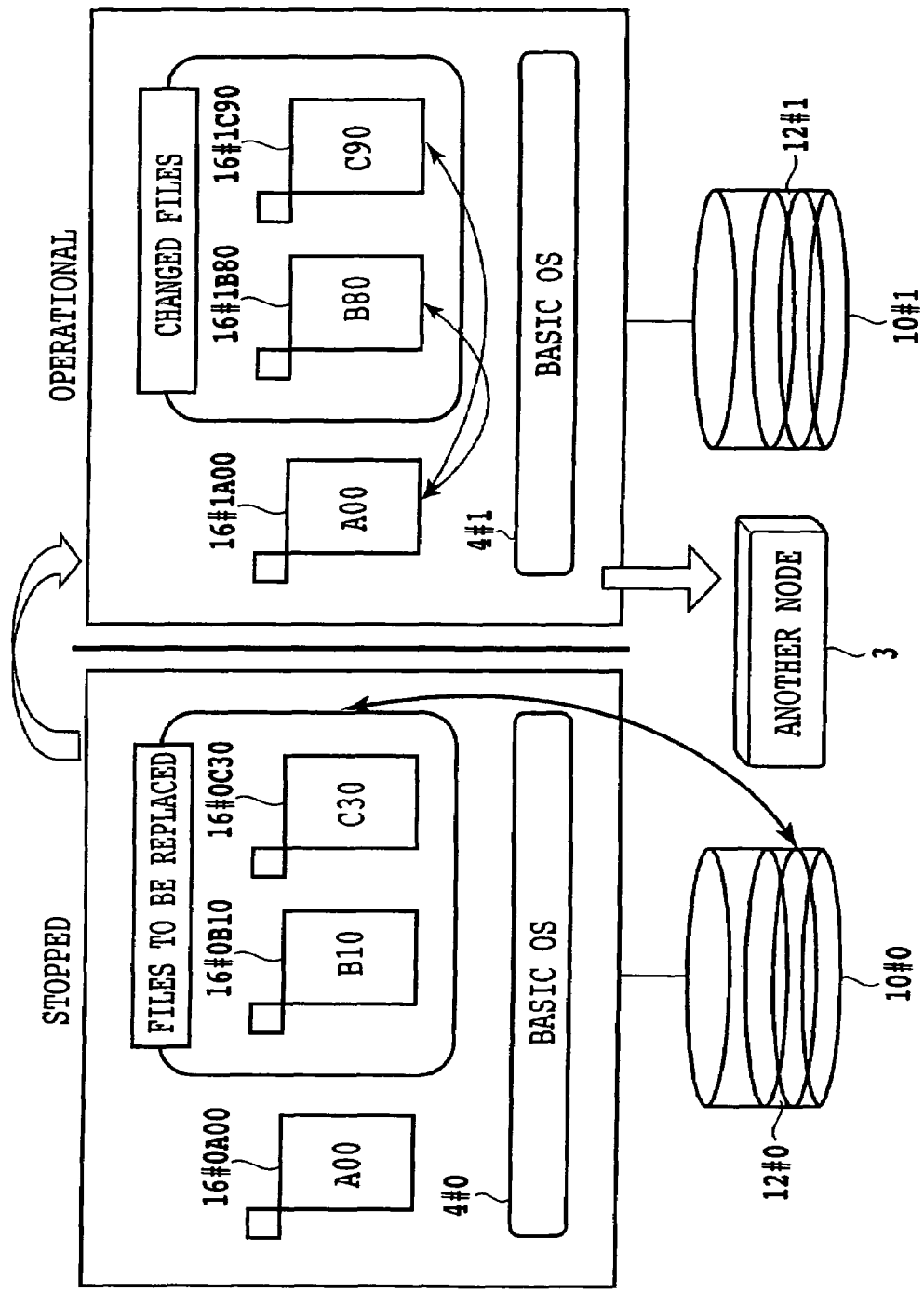
FIG. 14 is a diagram of conventional change to the new files.
Figure 15:
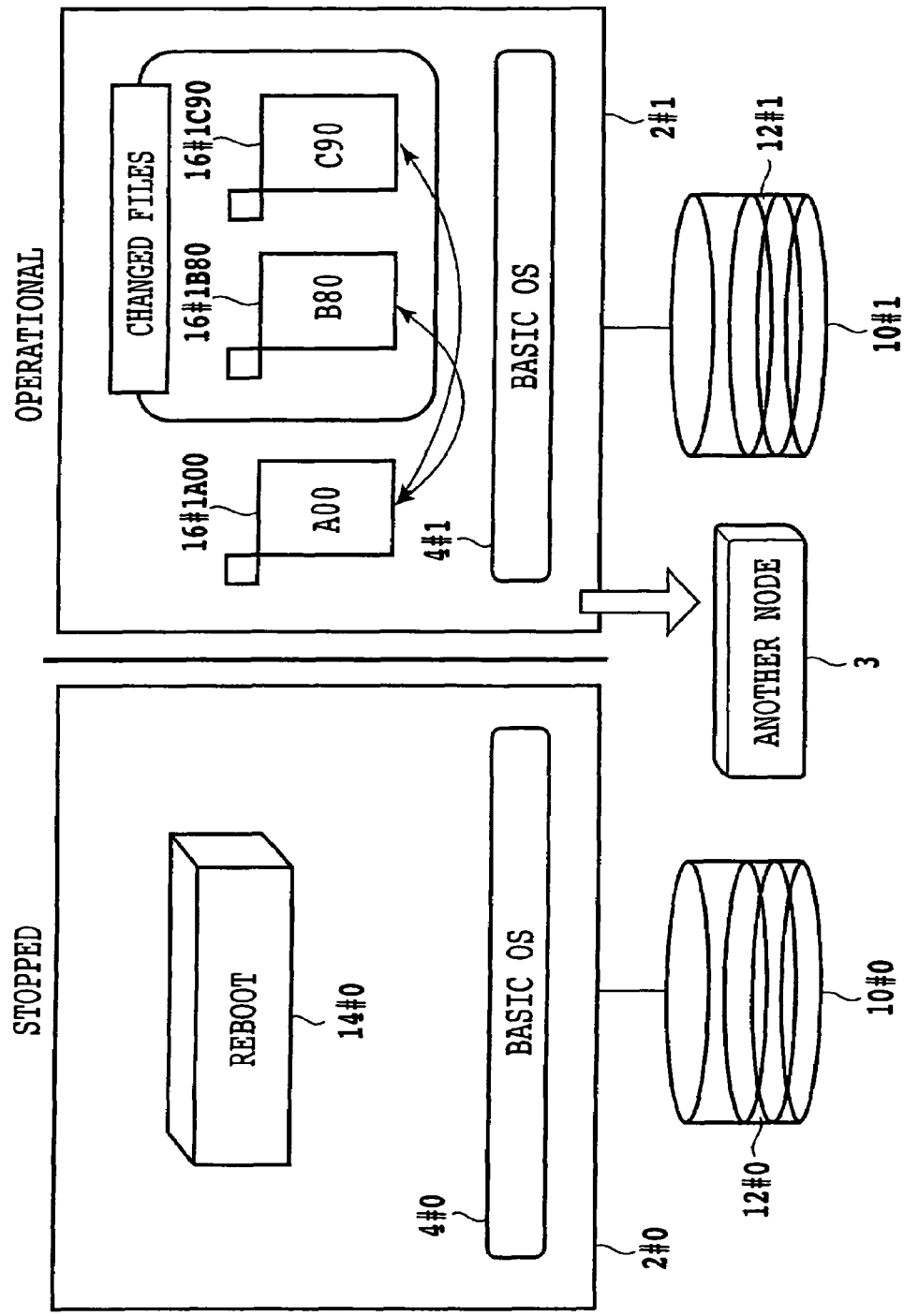
FIG. 15 is a diagram of conventional establishment of the new files.
Figure 16:
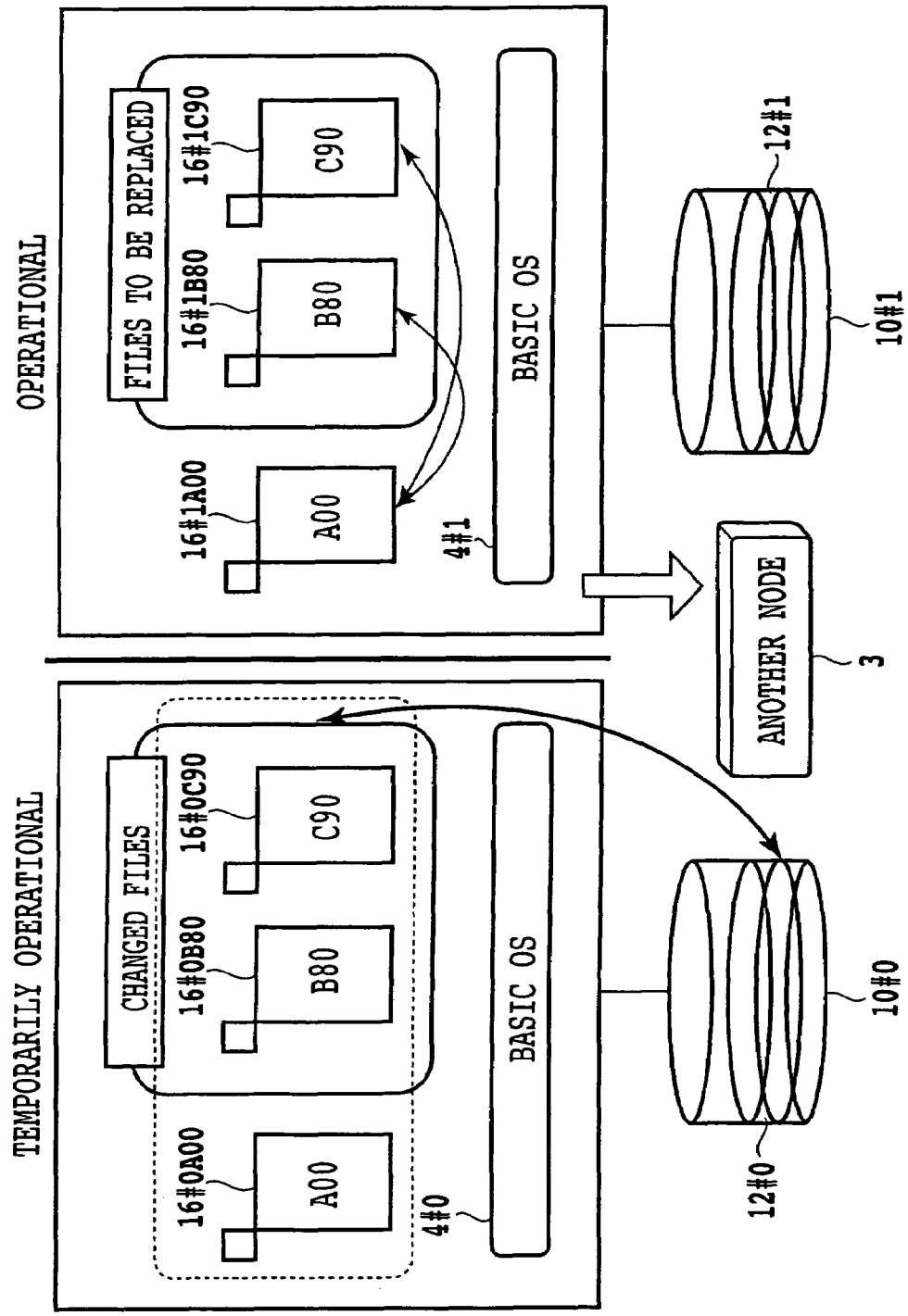
FIG. 16 is a diagram of conventional establishment of the new files.
Figure 17:
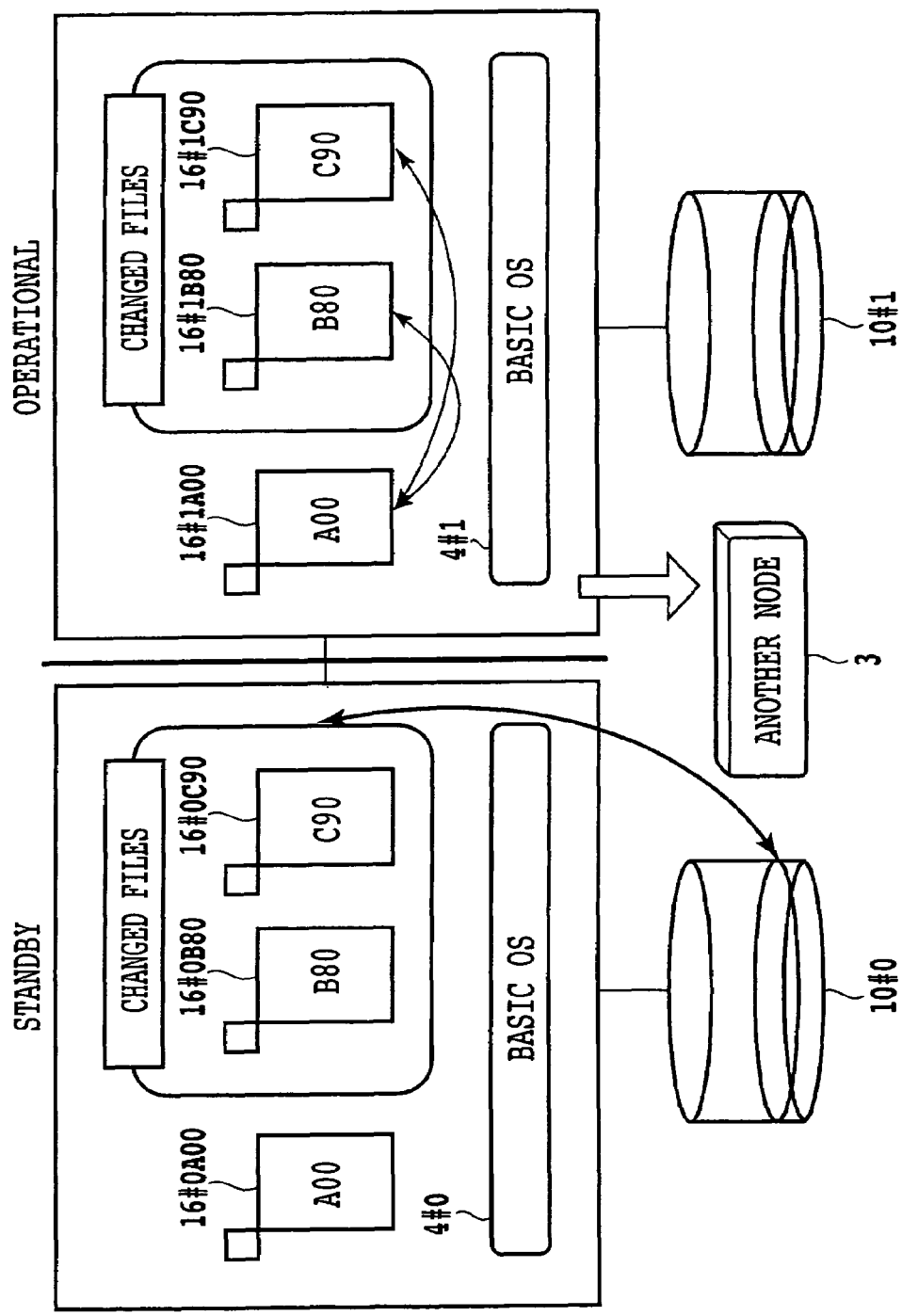
FIG. 17 is a diagram of conventional establishment of the new files.

FIG. 10 is a diagram showing establishment of the new files. As indicated by (400), the maintenance server 114 notifies the file update control unit 136 of a message to "establish the new files". As indicated by (402), the file update control unit 136 notifies the IP address/module name conversion DB managing unit 134 of "establish the IP addresses." As indicated by (404), the IP address/module name conversion DB managing unit 134 changes IP address/module name correspondence data in the state of "new" in the IP address/module name conversion DB 135 to "current" and deletes IP address/module name correspondence data (B10/10.20.30.55) in the state of "current" corresponding to the same module name as a module name of the changed IP address/module name correspondence data. The IP address/module name conversion DB managing unit 134 returns the IP address of the deleted data to the DHCP server 110 and returns a response to the file update control unit 136.

As indicated by (406), the file update control unit 136 requests the virtual server control unit 130 to delete the old module B10 of the IP address 10.20.30.55. As indicated by (408), the virtual server control unit 130 deletes the module of the IP address 10.20.30.55. Also, the virtual server control unit 130 determines whether there is only one module within the virtual host, and when there is only one module within the virtual host, the virtual server control unit 130 deletes the virtual host environment. In this case, since only the module B10 is present within the virtual host 124#B10 of the old module B10, the virtual host 124#B10 is deleted. As indicated by (410), the virtual server control unit 130 returns a response to the file update control unit 136. As indicated by (412), the file update control unit 136 returns a response to the message to "establish the new files" to the maintenance server 114. Thus, the module B10 is changed to the new module, and the module B00 is added. It is thus possible to load and start only modules to be started.

If a defective condition occurs in the started module of a new file before establishment of the new file so that service cannot be continued normally, the maintenance server 114 notifies the file update control unit 136 of a message to "restore a file". The file update control unit 136 notifies the IP address/module name conversion DB managing unit 134 to restore the file. The IP address/module name conversion DB managing unit 134 notifies all virtual hosts 124#i to make an update to an old IP address of the module of an identical module name with that of the new module, gives an instruction to resume operation to the old module, and deletes data in the state of "new" from the IP address/module name conversion DB 135. The file update control unit 136 instructs the virtual server control unit 130 to delete a virtual host of the started module. The virtual server control unit 130 deletes the virtual host. In this case, the routing control unit 132 saves messages to the new module to the message buffer managing unit 138, reads the messages from the message buffer managing unit 138, and then transmits the messages to the old module. Thereby the old module resumes operation.

As described above, according to the present invention, it is possible to replace only a module changed between a new and an old file, and minimize effects on replacement operation. Further, the present invention enables file replacement without involving processor changeover. It is therefore possible to realize file updates in a server environment of a single configuration without requiring a duplexed configuration, and thus reduce cost of hardware and software, reduce maintenance cost, and prevent service interruption or occurrence of defective conditions due to changeover.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A server apparatus having a function of loading a new module stored in a storing device into a main memory and changing over from an old module to the new module, said server apparatus comprising:

a virtual server control unit disposed in a virtual server Operating System (OS), for generating a plurality of virtual client Operating Systems (OSes) corresponding to one or more new modules to be started and for controlling the one or more new modules, including generating a first virtual client OS for one or more first new modules to be started based upon a file start instruction stored in said storing device;

a boot control unit disposed in each virtual client OS, for loading said first new modules to be started into said main memory and starting said first new modules to be started;

an identifier/module name conversion database (DB) managing unit disposed in said virtual server OS, for controlling dynamic assignment of an identifier to each said first new module to be started, registering a relation between module names of said first new modules and identifiers in a first table, and performing conversion between the module names of the first new modules and the identifiers;

a routing control unit disposed in said virtual server OS, for routing a message sent from the first new modules started by the first virtual client OS to a second module started by a second virtual client OS different from the first virtual client OS based upon an identifier of said second module, said identifier registered in said first table; and a file update control unit disposed in said virtual server OS, for requesting said routing control unit to stop communication to an old module having a module name identical with the module names of the first new modules to be started and instructing said routing control unit to save a message to said old module and sweep out said message to the first new modules based upon, a file change instructions, wherein each virtual client OS controls communication between the one or more new modules started by each virtual client OS without using the routing control unit.

2. The server apparatus as claimed in claim 1, wherein said file update control unit instructs said identifier/module name conversion DB managing unit to change from an old identifier to a new identifier for the message to the old module having the module name identical with the module names of said first new modules to be started module based upon an instruction to change to one of the first new modules, said identifier/module name conversion DB managing unit notifies all client OSes other than the virtual client OS for at first new modules to be started of the new identifier of said old module, and said client OSes other than the virtual client OS for the first new modules to be started transmit the message to the first new modules according to the new identifier.

3. The server apparatus as claimed in claim 1, further comprising an identifier/module name conversion control unit disposed in saideach virtual client OS, for registering the relation between said module names of the first new modules and the identifiers of said first new modules in a second table, and performing the conversion based upon said second table.

4. The server apparatus as claimed in claim 3, further comprising a communication control unit disposed in each virtual client OS, for adding to the message to the second module started by the second virtual client OS an identifier of said second module, said identifier being converted by said identifier/module name conversion control unit, and sending the message to said routing control unit, and controlling reception of the message to the second module corresponding to the module names of the first new modules converted by said identifier/module name conversion control unit from the identifier added to the message received from said routing control unit.

5. The server apparatus as claimed in claim 4, wherein said routing control unit saves the message to said old module to a buffer based upon an instruction from said file update control unit, adds to said message the identifier of one of the first new modules, said identifier being converted by said identifier/module name conversion DB managing unit from a destination identifier of said message saved to said buffer, and outputs said message to said communication control unit of one of the virtual client OSes that has started the one first new module.

6. The server apparatus as claimed in claim 1, wherein when an identifier is assigned to a started module, said identifier/module name conversion DB managing unit sets a state of said started module in said first table to "new."

7. The server apparatus as claimed in claim 6, wherein said file update control unit notifies said identifier/module name conversion DB managing unit of a file establishing instruction on the basis of a file establishing instruction, and on the basis of said notification, said identifier/module name conversion DB managing unit changes the state of "new" in said first table to "current," and deletes identifier/module name correspondence data for a module of a module name identical with a module name of said started module changed to "current."

8. The server apparatus as claimed in claim 7, wherein said file update control unit instructs said virtual server control unit to delete the old module of the module name identical with the module name of said started module on the basis of the file establishing instruction, and on the basis of the instruction from said file update control unit, said virtual server control unit instructs a virtual client OS that started said old module to delete said old module.

9. The server apparatus as claimed in claim 8, wherein when the virtual client OS that started said old module started module started only said old module, said virtual server control unit deletes said virtual client OS that started said old module.

10. The server apparatus as claimed in claim 1, wherein said identifier is an Internet Protocol (IP) address, and said identifier/module name conversion DB managing unit requests a Dynamic Host Configuration Protocol (DHCP) server to give said IP address.

11. A changeover method for loading a new module stored in a storing device into a main memory and changing over from an old module to the new module, said method comprising:

generating a plurality of virtual client Operating Systems (OSes) corresponding to one or more new modules to be started and for controlling the one or more new modules, including generating a first virtual client OS for one or more first new modules to be started based upon a file start instruction;

loading said first new modules to be started into said main memory and starting said first new modules to be started;

controlling dynamic assignment of an identifier to each said first new module to be started, registering a relation between module names of said first new modules and identifiers in a first table, and performing conversion between the module names of the first new modules and the identifiers;

routing a message sent from the first new modules started by the first virtual client OS to a second module started by a second virtual client OS different from the first virtual client OS based upon an identifier of said second module, said identifier registered in said first table; and requesting to stop communication to an old module having a module name identical with the module names of said the first new modules to be started and instructing to save a message to said old module and sweeping out said message to the first new modules based upon, on the basis of a file change instruction, wherein each virtual client OS controls communication between the new modules started by each virtual client OS without using the routing the message.

* * * * *

UNITED STATES PATENT AND TRADEMARK OFFICE
CERTIFICATE OF CORRECTION

PATENT NO. : 7,251,813 B2
APPLICATION NO. : 10/739297
DATED : July 31, 2007
INVENTOR(S) : Yukio Kosuge It is certified that error appears in the above-identified patent and that said Letters Patent is hereby corrected as shown below:

Column 12, Line 62, change "upon," to --upon--.

Column 12, Line 62, change "instructions," to --instruction,--.

Column 13, Line 15, change "saideach" to --each--.

Column 14, Line 12, before "only" delete "module started" (Second Occurrence).

Column 14, Line 48-49, change "upon, on the basis of" to --upon--.

Signed and Sealed this

Fourth Day of December, 2007

JON W. DUDAS
*Director of the United States Patent and Trademark Office*